United States Patent

[15] 3,639,047
[45] Feb. 1, 1972

Holle

[54] AUTOMATIC FOCUSING DEVICE FOR SLIDE PROJECTORS

[72] Inventor: Werner Holle, Wetzlar, Germany
[73] Assignee: Ernst Leitz GmbH, Wetzler, Germany
[22] Filed: May 11, 1970
[21] Appl. No.: 36,024

[30] Foreign Application Priority Data

Sept. 17, 1969 Germany .......................P 17 97 347.6

[52] U.S. Cl. ............................................................353/101
[51] Int. Cl. ........................................................G03b 3/100
[58] Field of Search ..................353/69, 101; 95/44; 352/140

[56] References Cited

UNITED STATES PATENTS

| 3,037,423 | 6/1962 | Shurcliff | 353/101 |
| 3,494,694 | 2/1970 | Morita | 353/101 |

*Primary Examiner*—Harry N. Haroian
*Attorney*—Krafft & Wells

[57] ABSTRACT

In a slide projector means are provided for projecting a light beam obliquely onto one face of the slide from which it is reflected to a photoelectric receiver. Scanning means in the path of the light beam guide the reflected beam in cycles to the receiver in such a manner that the reflections from the cover glass remote from the slide face whereon the light beam is projected are the first in each cycle to impinge on the photoelectric receiver. A bistable multivibrator is connected to the receiver which multivibrator is set in response to the pulses from the receiver exceeding a predetermined threshold value and is reset at the end of the cycle by a reference pulse. And means are provided which initiate the motion of a motor for displacing the slide along the optical axis in dependence on the time interval between successive setting and resetting pulses when this time interval differs from a predetermined value.

5 Claims, 4 Drawing Figures

AUTOMATIC FOCUSING DEVICE FOR SLIDE PROJECTORS

BACKGROUND OF THE INVENTION

The present invention relates to slide projectors and is particularly concerned with a device for automatically bringing the slide into focus.

There are already automatic focusing devices for slide projectors known in the art which comprise a projection lamp for projecting obliquely a light beam onto the slide and a twin photoelectric receiver fro receiving the light reflected from the slide surface. The current generated in the photoelectric receiver is used for setting a slide positioning device which includes a motor. If the slide happens to be glass covered not only a single light beam but a plurality of such beams will be reflected by a slide. In this plurality the beam reflected from the surface facing the projection lamp will be brightest with the intensity of the beams declining gradually. The intensity of the beam reflected from the slide surface remote from the projection lamp will then be the lowest. In order to equalize the different intensities of the reflected beams it has therefore already been suggested to weaken the effect which this particular portion of the twin photoelectric receiver has on the positioning device whereon the beam reflected from the front surface of the slide is incident.

Contrary thereto it is the object of the present invention to provide a focusing device which makes use of the different light beam intensities for determining from what surface each beam is reflected and, consequently, for positioning the slide accordingly so that the latter is automatically displaced along the optical axis until it occupies the plane of proper focus.

SUMMARY OF THE INVENTION

The above-stated object is attained by providing in a slide projector means for projecting a sensing light beam obliquely onto one face of the slide, a motor for displacing the slide along the optical axis of the projector, a photoelectric receiver for receiving reflections from the slide of the sensing light beam, a cyclically operative scanning device for so guiding the reflection past the photoelectric receiver that—in the presence of a glass-covered slide—the reflections from the cover glass on the side of the slide remote from said one face are the first of the reflections, which in each scanning cycle impinge on the photoelectric receiver, means for generating a reference pulse at a predetermined point in each scanning cycle, a bistable multivibrator set in response to pulses exceeding a predetermined threshold value from the photoelectric receiver and reset by the reference pulses, and means responsive to the time interval between successive setting and resetting pulses to initiate motion of the motor, when this time interval differs from a predetermined value.

Advantageously, the means responsive to the time interval comprises an electric circuit stage coupled to the motor and responsive to the ratio of the respective portions of each cycle for which the multivibrator is in the set and the reset state. The multivibrator then preferably in its set and in its reset state, respectively provides electrical outputs of mutually opposite polarity and wherein the mean value of the electrical outputs is applied to the circuit stage coupled to the motor.

According to a refinement of the invention, the device comprises an automatic amplitude control circuit coupling the photoelectric receiver to the setting input means of the multivibrator. Optionally, the device may further comprise a Schmitt trigger circuit, which is responsive to pulses exceeding a predetermined amplitude from the photoelectric receiver and includes output means coupled to the means responsive to the time interval.

BRIEF DESCRIPTION OF THE DRAWINGS

The invention will be more fully comprehended from the following description when taken in conjunction with the appending drawings, wherein.

DESCRIPTION OF THE PREFERRED EMBODIMENTS

Figure 1:
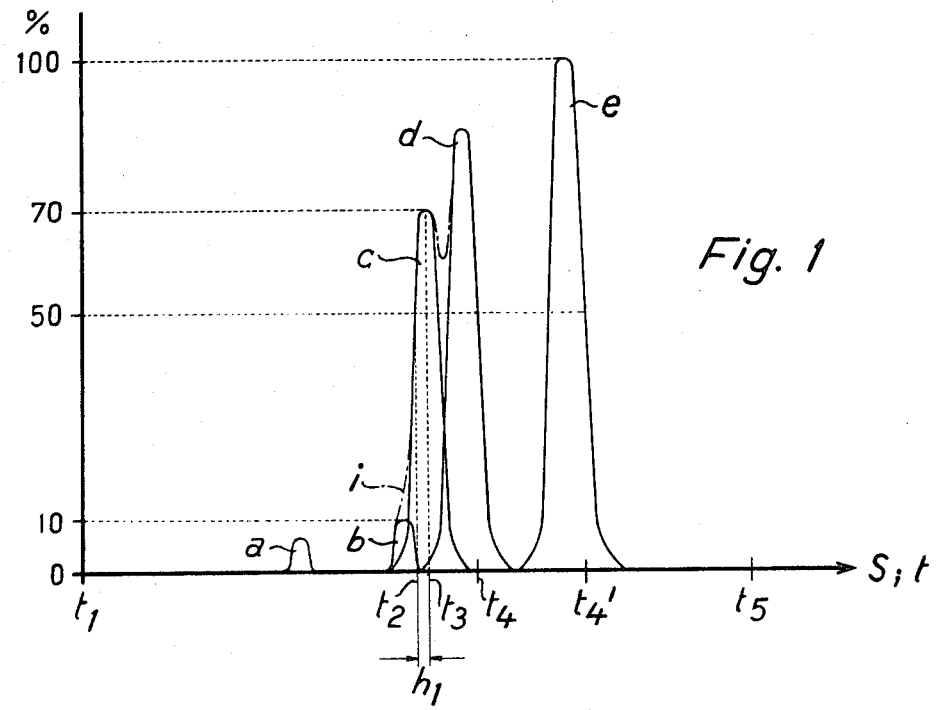
FIGS. 1 and 2 are diagrams of reflections which are produced on a glass-covered slide by the sensing light beam.
Figure 2:
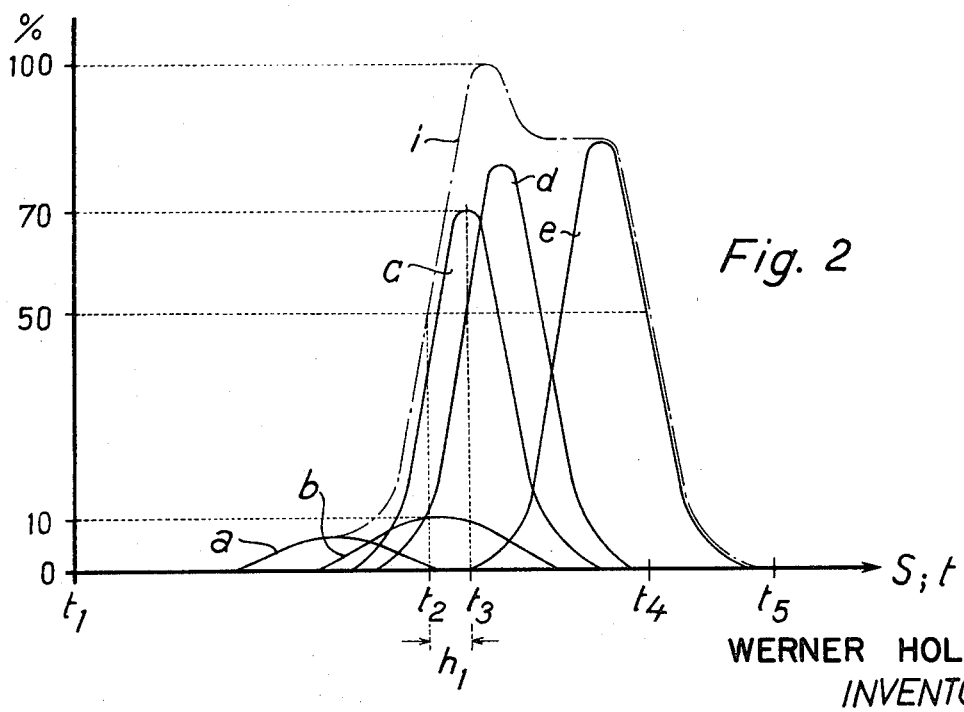

Referring to the FIGS. 1 and 2 there are illustrated the intensities of the various reflected light beams in a graph. The reflexes are numbered $a$ through $e$ and on the abscissa of the graph they are arranged in temporal order while on the ordinate there is marked the intensity of the reflexes expressed in a percentage of the brightest reflex.

A graph according to FIG. 1 is obtained when the sensing light beam results from a very narrow slit, while the graph shown in FIG. 2 results from a device which includes a somewhat broader slit. From the FIGS. 1 and 2 it will be recognized that the reflexes $e$ and $d$ from the front and rear surface of the slide cover glass which faces the projection device or sensing device are of highest intensity while the reflex from the film is of only about 70 percent of the highest intensity. The reflexes $a$ and $b$ from the front and rear surface of the rear cover glass, on the other hand, remain well below 10 percent of the maximum intensity. This is undoubtly caused by the absorption of light which occurs in the front glass and in the film when the light beams travel therethrough.

Figure 3:
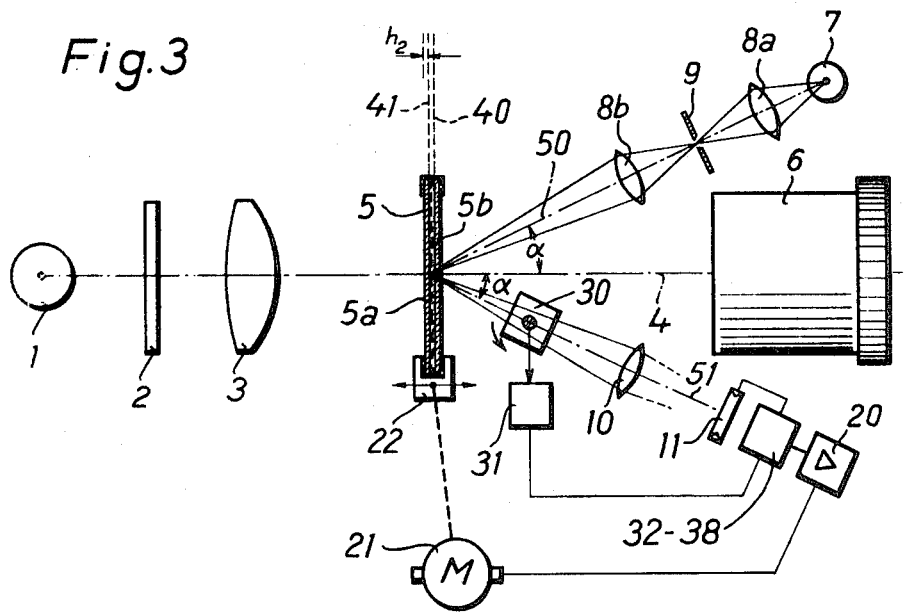
FIG. 3 illustrated an automatic focusing device embodying the invention.

In FIG. 3 of the drawings a projection light source 1 illuminates a slide 5, which may or may not be provided with cover glasses 5$a$ and 5$b$, its beam passing through a heat-absorbing filter 2 and a condenser 3. The slide 5 is mounted in a slide carrier 22 which is movable in the direction of the optical axis. When not mounted under glass, the slide 5 is sharply imaged from a plane 40, and when mounted under glass, it is sharply imaged from a plane 41, in a projection plane (not shown) by means of an image projection lens 6. The distance between the planes 40 and 41 amounts to $0.34 \times k$, for a glass thickness $k$ and a refractive index $n-1.52$ for the cover glass.

The focusing device comprises a sensing light beam projection device, a scanning device, and a position adjusting device moving the slide. The optical axis 50 of the sensing light beam projection device and the optical axis 51 of the position adjusting device are each disposed at an angle $\alpha$ to a reference axis 4 perpendicular to the slide 5. The sensing light beam projection device comprises a lamp 7, lenses 8$a$ and 8$b$ as well as a slit 9.

Figure 4:
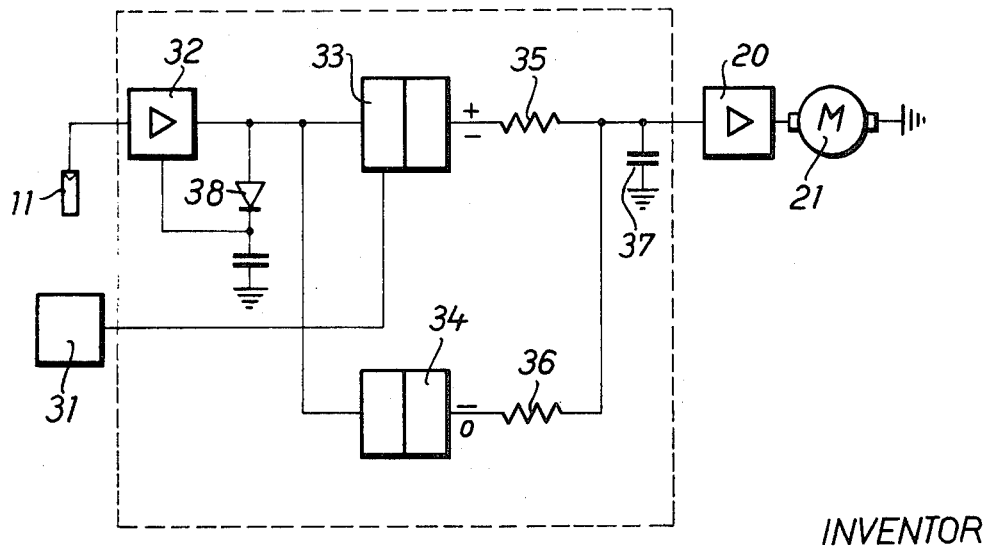
FIG. 4 shows a detail of the electric control circuit arrangement.

The position adjusting device comprises a lens 10, a photoelectric receiver 11, an evaluating circuit arrangement illustrated in FIG. 4, a motor driving circuit 20, an adjusting motor 21 and the slide carrier 22.

The scanning device is disposed in the region of the optical axis 50 or 51. In the preferred embodiment, the scanning device comprises a rotating glass cube 30, but given a suitable arrangement of the lens 10 and of the photoelectric receiver 11, the device could also comprise a rotating mirror tube or a rotating spiral slit or any other suitable device periodically deflecting in one direction the sensing beam or the reflected beam. The scanning device further comprises a pulse generator 31, which generates a reference pulse synchronously in each scanning cycle, preferably at the beginning or the end of each scanning cycle. The pulse generator 31 may be controlled by means of a light pulse impinging on a further photoelectric receiver, while alternatively magnetic means could be used to produce the pulses, or a mechanical contact could be periodically opened and closed. If the glass cube 30 is driven by means of a phase-locked synchronous motor, the reference signal can be obtained from the mains voltage. The scanning device may also be driven by the fan motor of the projector.

The evaluating circuit is illustrated in FIG. 4 and includes the photoelectric receiver 11, a variable-gain amplifier 32, which amplifies the current of the photoelectric receiver 11 in such a manner that the maximum amplitude is brought to an approximately constant value, a bistable multivibrator 33, optionally a Schmitt trigger 34 connected in parallel therewith and followed by resistors 35 or optionally 36, a capacitor 37, a servo amplifier 20, an the adjusting motor 21. The control property of the amplifier 32 is indicated by a control loop 38. The setting and resetting inputs of the bistable multivibrator 33 are connected to the variable-gain amplifier 32 and the reference pulse transmitter 31, respectively. The triggering voltage for the electrical signal coming from the variable-gain amplifier 32 is adjusted in a predetermined ratio to the maximum amplitude of the amplifier output, namely in a region of from 10 to 70 percent of this maximum amplitude. A value of 50 percent is preferred. The other output of the multivibrator 33 is adjusted so that the reference pulses reset and thus bring the trigger stage to its normal position. Depending on the position of the multivibrator 33, the output signal of the latter is either positive or negative. The Schmitt trigger 34 is likewise adjusted to a value in the region of 70 to 10 percent of the maximum amplitude of the variable-gain amplifier 35; a triggering voltage of 50 percent of the maximum amplitude is preferred. The output current of the Schmitt trigger 34 is either negative or zero. The output signals of the multivibrator 33 and of the Schmitt trigger 34 pass through the resistors 35 and 36 respectively, the values of which are different, and are averaged by the action of the capacitor 37, taking positive and negative values into account. After amplification by the servo amplifier 20, this averaged output current serves as control current for the adjusting motor 21.

The mode of operation of the circuit arrangement, omitting the Schmitt trigger 34, is as follows:

In consequence of the reflections $a-e$ sequentially impinging on the photoelectric receiver 11, it produces electrical pulses of the form illustrated in FIGS. 1 and 2. These pulses are brought by the variable-gain amplifier 32 to an approximately constant maximum amplitude, as shown in FIGS. 1 and 2. When half the maximum amplitude is reached (point of time $t_2$), the multivibrator 33 is set and changes state to supply, say, a positive output current. At the beginning of the next scanning cycle (moment of time $t_5$), the multivibrator 33 is reset by a reference pulse and thus returned into its normal position, in which it then supplies a negative output current. The averaged output current becomes zero if the duty ratio is unity. This is obviously the case when the moment of time $t_2$ at which the change of state is brought about by the controlled current lies accurately in the middle between the moment of time $t_1$ and $t_5$ of the changes of state effected by the reference pulses. As can be seen in FIGS. 1 and 2, the automatic system thus does not adjust the slide to the plane of sharpness 41 which would correspond to the sensing moment of time $t_3$. The distance $h_2$ from the desired plane 41 is, however, a constant of the projector, which depends mainly on the width of the gap 9. The introduction of this constant into the control system is effected by adjusting the point at which the optical axes 50 and 51 (FIG. 3) meet one another to a distance $h_2$, which depends on the distance $h_1$, behind the adjusted plane 41 of the lens 6, which is effected automatically. If the actual position of the slide moves away from the plane 41, the moment of time at which the multivibrator 33 changes state is reached before or after the moment of time $t_2$, so that the duty ratio is no longer unity. The servo amplifier therefore receives a positive or negative averaged current and moves the adjusting motor 21 in the corresponding direction.

The mode of operation of the circuit arrangement containing a Schmitt trigger is as follows:

The desirable correction still depends finally on whether cover glasses 5a, 5b are used and what the thickness $k$ of these cover glasses is. The reason for this lies in the oblique incidence of the sensing beam at the angle $\alpha$, so that the optical shortening of the sensing beam 15 is greater than the optical shortening of the image projection lens 6. Information regarding the existence and the thickness of the cover glasses is supplied by the Schmitt trigger 34. This Schmitt trigger changes state at the moment of time $t_2$ and $t_4$ or $t'_4$ and during this period of time supplies a current which is also used to form the average value through the capacitor 37. The duty ratio of the trigger stage 33 is thus adjusted to deviate slightly from unity in such a manner that either the plane 40 or the plane 41 is attained. If the angle $\alpha$ is made small (30° or smaller), the Schmitt trigger 34 may without difficulty be omitted. With an angle $\alpha$ of 45°, the error amounts to 0.13×k while at 25° it decreases to 0.04×k. If it is not desired that the projected picture should remain sharp whenever a change is made from glassless to glass-mounted slides or vice versa, that is to say if only identically glass-mounted slides are to be projected without readjustment of the sharpness, as is usually the case in practice, the Schmitt trigger 34 is likewise not required.

What is claimed is:

1. An automatic focusing device for slide projectors, comprising:
   a. means for projecting a sensing light beam obliquely onto one surface of the slide;
   b. a photoelectric receiver for receiving reflections from the slide of the sensing light beam;
   c. a cyclically operative scanning device for guiding the reflected beams to the photoelectric receiver in such a manner that—in the presence of a glass-covered slide—the reflections from the cover glass on the side of the slide remote from the sensing beam reflection means are the first in each scanning cycle to impinge on the photoelectric receiver;
   d. a bistable multivibrator electrically connected to the photoelectric receiver, and set in response to pulses from the photoelectric receiver when the pulses exceed a predetermined threshold value and reset by reference pulses;
   e. means connected to the scanning device and connected to the multivibrator for generating a reference pulse at a predetermined point in each scanning cycle;
   f. a motor for displacing the slide along the optical axis; and
   g. means responsive to the time interval between successive setting and resetting pulses for initiating motion of the motor, when this time interval differs from a predetermined value, the means being electrically connected to the bistable multivibrator.

2. A device as claimed in claim 1, wherein the means responsive to the time interval comprises an electric circuit stage coupled to the motor and responsive to the ratio of the respective portions of each cycle for which the multivibrator is in the set and in the reset state.

3. A device as claimed in claim 1, wherein the multivibrator in its set and in its reset state, respectively provides electrical outputs of mutually opposite polarity and wherein the mean value of the electric outputs is applied to he circuit stage coupled to the motor.

4. A device as claimed in claim 1, wherein the photoelectric receiver is coupled to the setting input means of the multivibrator by an automatic amplitude control circuit.

5. A device as claimed in claim 1, and further comprising a Schmitt trigger circuit, which is responsive to pulses exceeding a predetermined amplitude from the photoelectric receiver and includes output means coupled to the means responsive to the time interval.

* * * * *